(12) United States Patent
Iwanaga

(10) Patent No.: US 7,665,851 B2
(45) Date of Patent: Feb. 23, 2010

(54) PROJECTOR HAVING A COLOR WHEEL INCLUDING INTERMEDIATE COLOR FILTERS

(75) Inventor: Masakuni Iwanaga, Akishima (JP)

(73) Assignee: Casio Computer Co., Ltd., Tokyo (JP)

(*) Notice: Subject to any disclaimer, the term of this patent is extended or adjusted under 35 U.S.C. 154(b) by 436 days.

(21) Appl. No.: 11/387,341

(22) Filed: Mar. 23, 2006

(65) Prior Publication Data

US 2006/0215128 A1     Sep. 28, 2006

(30) Foreign Application Priority Data

Mar. 25, 2005     (JP)     ............ 2005-089624

(51) Int. Cl.
*G03B 21/14* (2006.01)
*G02F 1/135* (2006.01)

(52) U.S. Cl. .............. 353/84; 353/20; 349/25; 349/30

(58) Field of Classification Search ............ 353/84, 353/20; 349/30, 25
See application file for complete search history.

(56) References Cited

U.S. PATENT DOCUMENTS

| | | | |
|---|---|---|---|
| 6,147,720 A * | 11/2000 | Guerinot et al. ........ 348/744 |
| 6,324,006 B1 | 11/2001 | Morgan | |
| 6,567,134 B1 | 5/2003 | Morgan | |
| 6,726,333 B2 | 4/2004 | Huibers et al. | |
| 6,795,140 B2 | 9/2004 | Shigeta | |
| 7,012,577 B2 | 3/2006 | Wada et al. | |
| 7,066,605 B2 | 6/2006 | Dewald et al. | |
| 2002/0109821 A1* | 8/2002 | Huibers et al. ......... 353/84 |
| 2005/0001995 A1* | 1/2005 | Dewald et al. ......... 353/84 |
| 2005/0184926 A1* | 8/2005 | Wada et al. ........... 345/32 |
| 2006/0221026 A1* | 10/2006 | Roth et al. ........... 345/88 |

| | | |
|---|---|---|
| 2007/0013965 A1 | 1/2007 | Iwanaga |

(Continued)

FOREIGN PATENT DOCUMENTS

JP     11-264953 A     9/1999

(Continued)

OTHER PUBLICATIONS

Japanese Office Action (and English translation thereof) dated Dec. 2, 2008, issued in a counterpart Japanese Office Action.

(Continued)

*Primary Examiner*—Georgia Y Epps
*Assistant Examiner*—Magda Cruz
(74) *Attorney, Agent, or Firm*—Frishauf, Holtz, Goodman & Chick, P.C.

(57) ABSTRACT

A color wheel (35) has equally arranged RGB primary color filters, and intermediate color filters each arranged between adjacent primary color filters. A time division driver (39) drives a spatial light modulator (31) by supplying color signals corresponding to color of the lights from the color wheel (35) to the spatial light modulator (31). The time division driver (39) controls the spatial light modulator (31) in accordance with display control instructed by a control unit (14). Since the intermediate color filters are arranged between the adjacent primary color filters, a projector engine (13) projects mixed color lights during color mixture terms where the primary color and the intermediate color are mixed, thus improves the color reproduction performance.

11 Claims, 10 Drawing Sheets

U.S. PATENT DOCUMENTS

| | | |
|---|---|---|
| 2007/0024813 A1 | 2/2007 | Blonde et al. |
| 2007/0058088 A1* | 3/2007 | Schubert et al. ............. 348/743 |

FOREIGN PATENT DOCUMENTS

| | | |
|---|---|---|
| JP | 2002-006395 A | 1/2002 |
| JP | 2004-045989 A | 2/2004 |
| JP | 2004-205798 A | 7/2004 |
| JP | 2004-245886 A | 9/2004 |
| WO | WO 2004/102245 A1 | 11/2004 |
| WO | WO 2005/011288 A2 | 2/2005 |
| WO | WO 2005/019909 A2 | 3/2005 |

OTHER PUBLICATIONS

U.S. Office Action dated Jul. 20, 2009, issued in related U.S. Appl. No. 11/483,337.

* cited by examiner

SPECTRAL PROPERTIES OF FILTER 35R (RED)

SPECTRAL PROPERTIES OF FILTER 35G (GREEN)

SPECTRAL PROPERTIES OF FILTER 35B (BLUE)

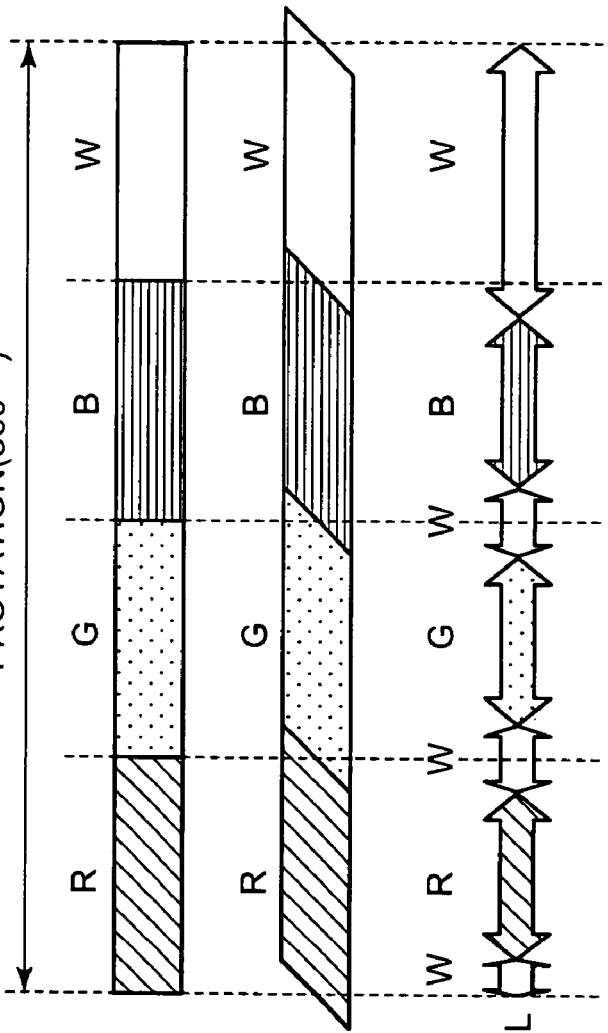

PROJECTOR HAVING A COLOR WHEEL INCLUDING INTERMEDIATE COLOR FILTERS

FIELD OF THE INVENTION

The present invention relates to a projector.

DESCRIPTION OF THE RELATED ART

A projector having a color wheel and a spatial light modulator has been known, for example, Unexamined Japanese patent application KOKAI publication No. 2004-045989. As shown in FIG. 9, a typical color wheel of a conventional projector has circularly arranged color filters of red (R), green (G), blue (B) and white (W).

The projector drives the color wheel to rotate, thus lights from a light source are divided into primary colors RGB as shown in FIG. 10A. The divided primary color lights are output after time divisional processing.

Since area sizes of luminous fluxes in the primary color lights are equal respectively, the output primary color lights are mixed at borders between the adjacent filters as shown in FIG. 10B.

To generate images with using such characterized luminous fluxes, the conventional projectors usually perform display control with using the spatial light modulator. As shown in FIG. 10C, the conventional projector supplies RGB signal to the spatial light modulator in accordance with RGB components of the output luminous fluxes. The projector also supplies a white color signal as a brightness control signal to the spatial light modulator during the primary colors are mixed (color mixture term), to improve the brightness. In a case where improvement of color purity is required, the projector may supply a black color signal to the spatial light modulator during the color mixture term.

SUMMARY OF THE INVENTION

In consideration of the aforementioned circumstances, the present invention has been made, and an object of the present invention is to provide a projector which is able to improve color reproduction performance.

In order to achieve the above object, a projector according to an aspect of the present invention is a projector for projecting images onto a screening member, comprises:

a light source which emits lights;

a filter unit which has a plurality of primary color filters for dividing the lights from the light source into a plurality of primary color lights, and a plurality of intermediate color filters arranged between the adjacent primary color filters each of which is colored by an intermediate color between the adjacent primary colors;

a spatial light modulator which is driven to project the colored lights from the filter unit to the screening member to project the images; and a display driver, to which a plurality of primary color signals for generating the images to be projected onto the screening member are supplied, which generates intermediate color signals based on the supplied primary color signals, and drives the spatial light modulator by supplying the primary color signals to the spatial light modulator so that primary color of the supplying primary color signal corresponds to primary color of the lights from the filter unit and by supplying the generated intermediate color signals to the spatial light modulator so that intermediate color of the generated intermediate color signal corresponds to intermediate color of lights from the filter unit.

In order to achieve the above object, a method according to another aspect of the present invention is a method for controlling a spatial light modulator in a projector which comprises:

a light source which emits lights;

a filter unit which has a plurality of primary color filters for dividing the lights from the light source into a plurality of primary color lights, and a plurality of intermediate color filters arranged between the adjacent primary color filters each of which is colored by an intermediate color between the adjacent primary colors; and the spatial light modulator which is driven to project the colored lights from the filter unit to the screening member to project the images, wherein the method comprises the steps of:

obtaining a plurality of primary color signals for generating images to be projected onto the screening member;

supplying the primary color signals to the spatial light modulator so that primary color of the supplying primary color signal corresponds to primary color of lights from the filter unit;

generating intermediate color signals based on the obtained primary color signals; and supplying the intermediate color signals to the spatial light modulator so that intermediate color of the supplying intermediate color signal corresponds to intermediate color of lights from the filter unit.

In order to achieve the above object, a program according to still another aspect of the present invention is a program for controlling a spatial light modulator in a projector which comprises:

a light source which emits lights;

a filter unit which has a plurality of primary color filters for dividing the lights from the light source into a plurality of primary color lights, and a plurality of intermediate color filters arranged between the adjacent primary color filters each of which is colored by an intermediate color between the adjacent primary colors; and the spatial light modulator which is driven to project the colored lights from the filter unit to the screening member to project the images, wherein the program comprises the steps of:

obtaining a plurality of primary color signals for generating images to be projected onto the screening member;

supplying the primary color signals to the spatial light modulator so that primary color of the supplying primary color signal corresponds to primary color of lights from the filter unit;

generating intermediate color signals based on the obtained primary color signals; and supplying the intermediate color signals to the spatial light modulator so that intermediate color of the supplying intermediate color signal corresponds to intermediate color of lights from the filter unit.

In order to achieve the above object, a projector according to still another aspect of the present invention is a projector for projecting images onto a screening member, comprises:

light source means for emitting lights;

filter means for dividing the lights from the light source into a plurality of primary color lights by a plurality of primary color filters and a plurality of intermediate color filters arranged between the adjacent primary color filters each of which is colored by an intermediate color between the adjacent primary colors;

spatial light modulation means for projecting the colored lights from the filter means to the screening member to project the images; and display control means for generating intermediate color signals based on a plurality of supplied primary color signals for the images to be projected onto the screening member, and for driving the spatial light modulation means by supplying the primary color signals to the spatial light modulator so that primary color of the supplying primary color signal corresponds to primary color of the lights from the filtering means and by supplying the generated intermediate color signals to the spatial light modulation means so that intermediate color of the generated intermediate color signal corresponds to intermediate color of lights from the filtering means.

In order to achieve the above object, a time division driver according to still another aspect of the present invention is a time division driver which carries out time divisionary control for image projection, which is characterized by:

generating intermediate color signals each representing an intermediate color among primary colors based on a plurality of supplied primary color signals;

time divisionary transmitting the primary color signals and the intermediate color signals to spatial light modulator so that the spatial light modulator modulates lights from a light source to project images onto a screening member; and controlling the light source by supplying control signals to the light source so that lights from the light source having colors corresponding to the primary color signals and the intermediate color signals are supplied to the spatial light modulation.

In order to achieve the above object, a spatial light modulator according to still another aspect of the present invention is a spatial light modulator which carries out light modulation for image projection, which is characterized by:

receiving control signals time divisionary supplied from a time division driver including signals based on not only primary colors but also intermediate colors; and modulating lights whose colors are time divisionary changes based on the received control signals.

BRIEF DESCRIPTION OF THE DRAWINGS

These objects and other objects and advantages of the present invention will become more apparent upon reading of the following detailed description and the accompanying drawings in which:

FIG. 10 is a diagram for explaining display control by a conventional projector.

DETAILED DESCRIPTION OF THE PREFERRED EMBODIMENTS

A projector according to embodiments of the present invention will now be described with reference to drawings.

Figure 1:
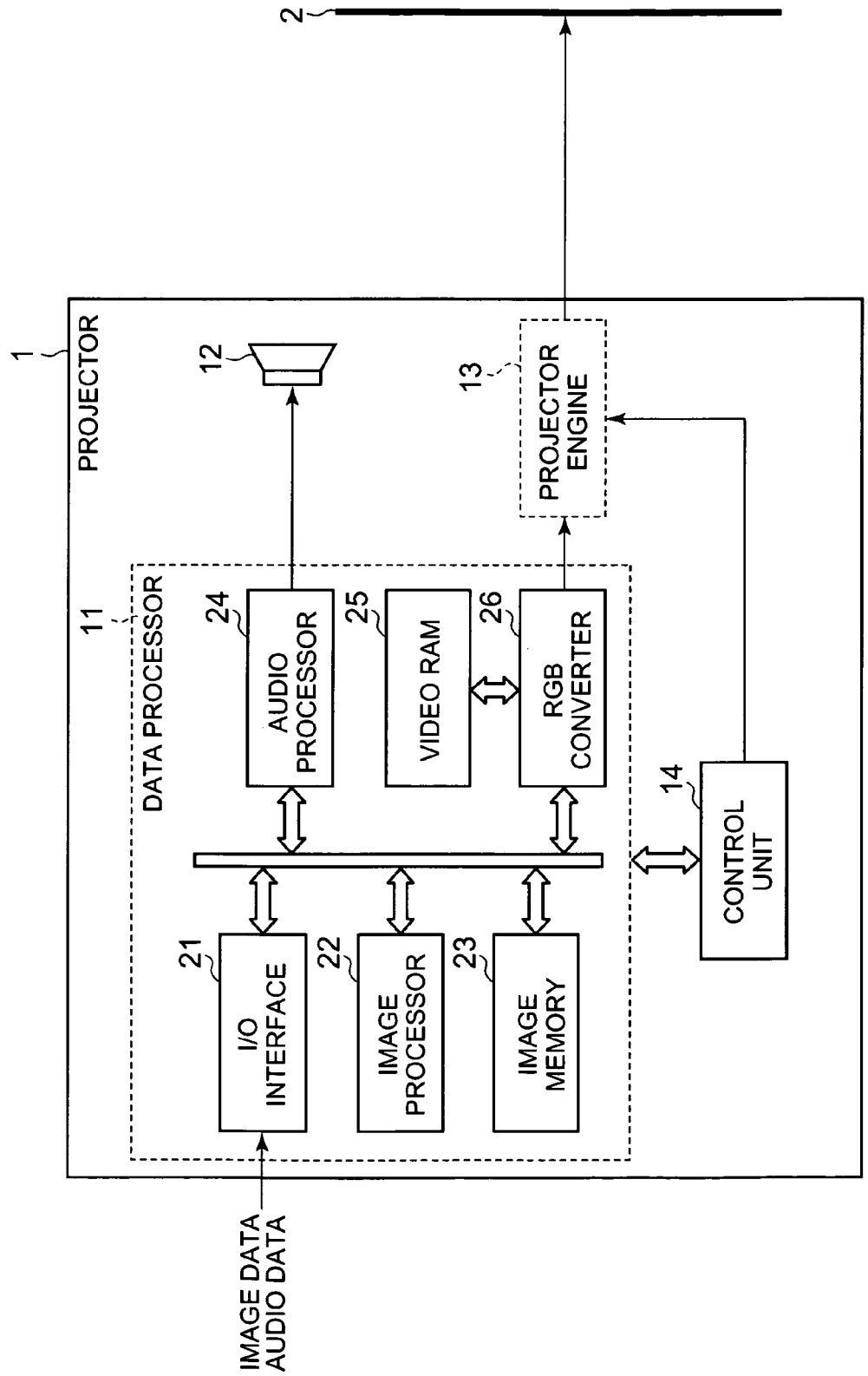
FIG. 1 is a block diagram showing the structure of a projector according to the embodiment of the present invention.

FIG. 1 is a block diagram exemplifying the structure of a projector 1 according to the present embodiment.

The projector 1 according to the present embodiment is designed to project images onto a screen 2, and comprises a data processor 11, a speaker 12, a projector engine 13, and control unit 14.

The data processor 11 mainly performs data processing onto supplied image data to generate image data of images to be projected to the screen 2. The data processor 11 also performs data processing onto supplied audio data to generate audio signals to be output. Such the data processor 11 further comprises an input/output (I/O) interface 21, an image processor 22, an image memory 23, an audio processor 24, a video RAM 25, and an RGB converter 26.

The I/O interface 21 inputs and/or outputs the image data and/or the audio data.

The image processor 22 converts the supplied image data into predetermined formatted data. The image processor 22 also performs image processing such as keystone collection based on data representing slant angle of the screen 2. The angle data may be supplied to the image processor 22 from the control unit 14.

The image memory 23 may be comprised of a flash memory and the like to store image data after image processing by the image processor 22, and the like.

The audio processor 24 may comprises a sound circuit such as a PCM sound source to convert supplied audio data into analog signals to be output by the speaker 12.

The video RAM 25 is prepared for developing the image data.

The RGB converter 26 converts the image data into RGB signals after developing the supplied image data in the video RAM 25. The RGB converter supplies the generated RGB signals to the projector engine 13.

The speaker 12 outputs sounds based on the audio signals supplied from the audio processor 24 in the data processor 11.

Figure 2:
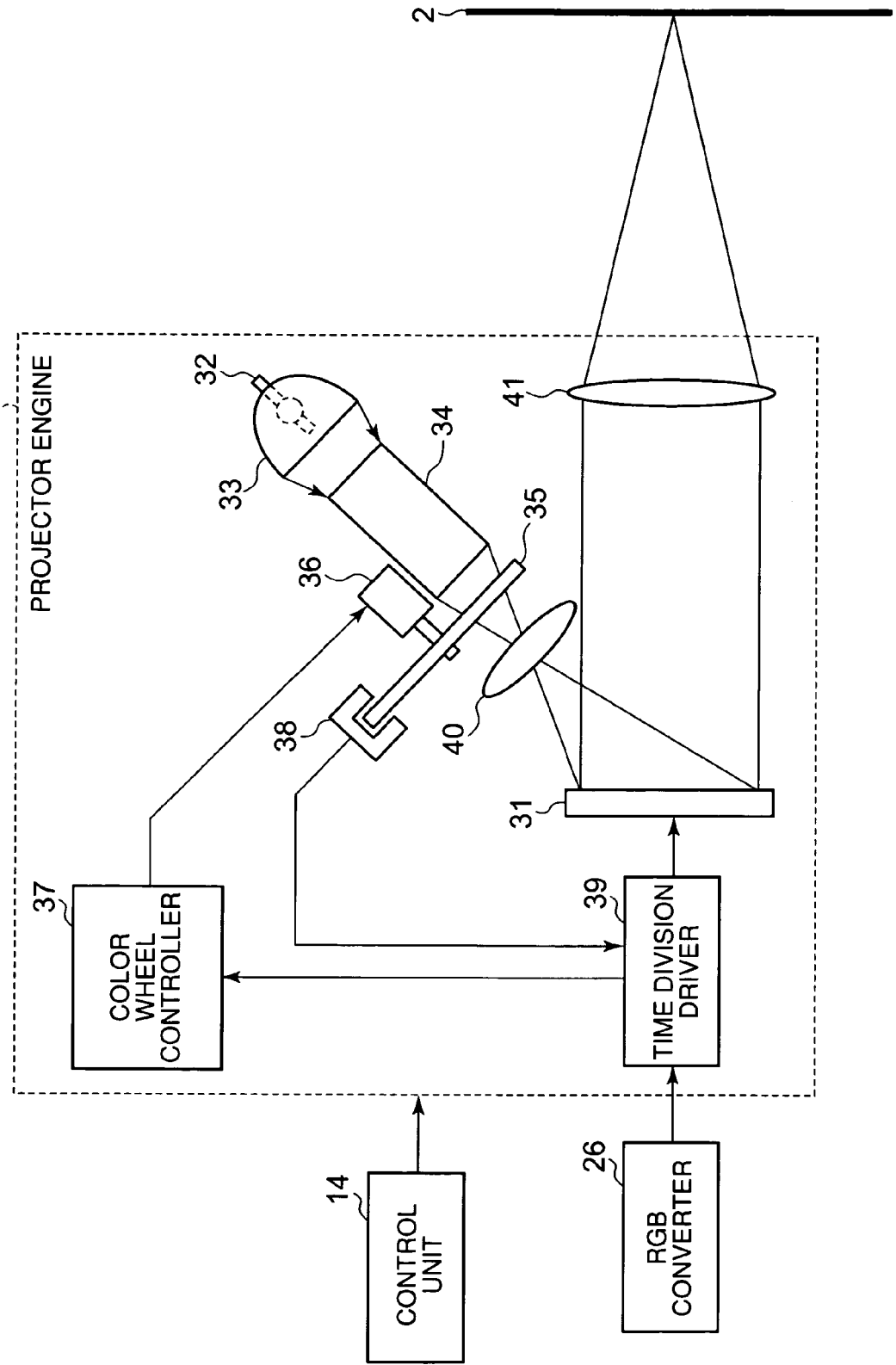
FIG. 2 is a diagram showing the structure of a projector engine shown in FIG. 1.

The structure of the projector engine 13 will now be described with referenced to FIG. 2. The projector engine 13 is a core component of the projector 1 which project images based on the image data supplied from the data processor 11. As shown in FIG. 2, the projector engine 13 comprises a spatial light modulator 31, a lamp 32, a reflector 33, a mirror tube 34, a color wheel 35, a color wheel motor 36, a color wheel controller 37, an optical sensor 38, a time division driver 39, a light source lens 40, and a projection lens 41.

The spatial light modulator 31 comprises multiple micro mirrors (not shown). The micro mirrors are made of, for example, minute aluminum pieces each size is about 10 to 20 μm, and these reflect lights. In the spatial light modulator 31, such the micro mirrors are matrix arrayed and driven by the time division driver 39. Each of the micro mirrors are driven to be slant, thus reflect output lights from the color wheel toward the screen 2.

The lamp 32 emits white color lights as a light source.

The reflector 33 reflects the lights emitted by the lamp 32 toward the mirror tube 34.

The mirror tube 34 leads the white color lights emitted by the lamp 32 to the color wheel 35 with reflecting the lights at its inner surface so as to equalize the light distribution.

The color wheel 35 has a plurality of primary color filters and a plurality of intermediate color filters. These filters are transparent colored filters, thus the lights from the lamp 32 penetrate through these color filters. The primary color filters are designed to divide the output lights into primary color lights. Each of the intermediate color filters comprises an intermediate colored filter whose color is intermediate between the adjacent primary colored filters.

Figure 3:
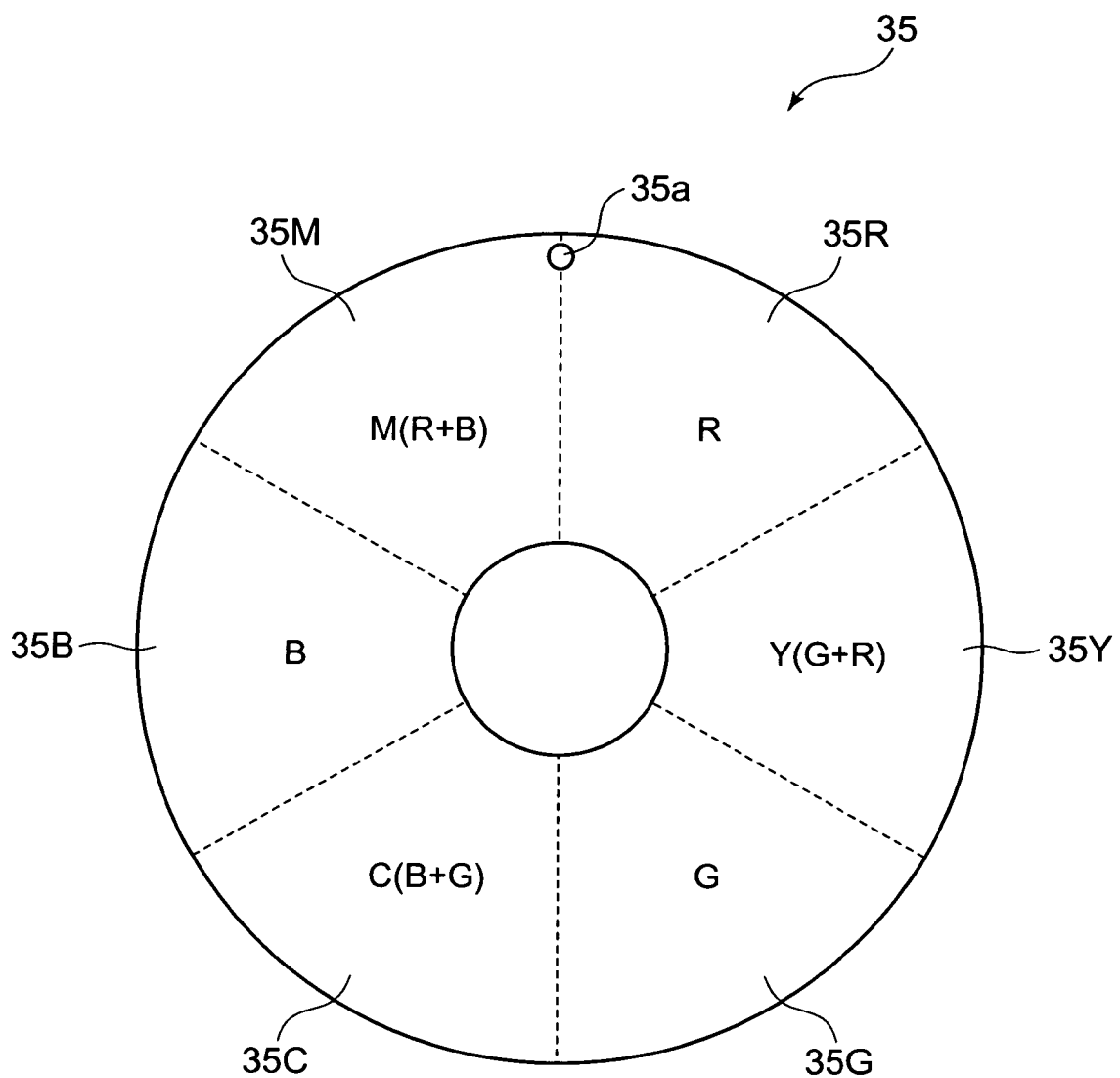
FIG. 3 is a diagram showing arrangement of filters in a color wheel shown in FIG. 2.
Figure 4A:
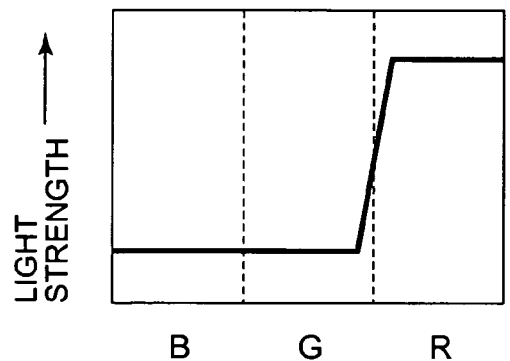
FIG. 4A is a diagram showing spectral properties of a red filter (R) shown in FIG. 3.
Figure 4B:
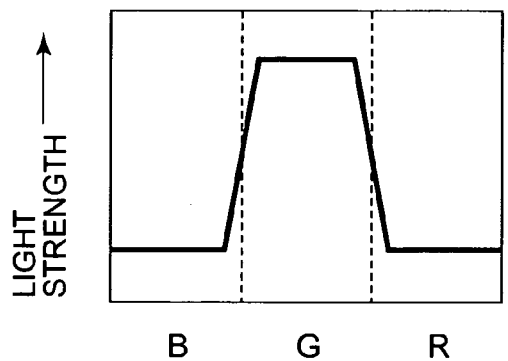
FIG. 4B is a diagram showing spectral properties of a blue filter (B) shown in FIG. 3.
Figure 4C:
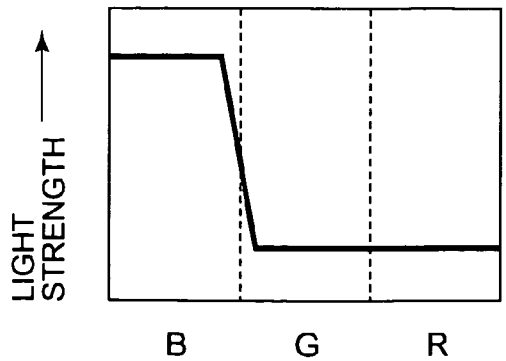
FIG. 4C is a diagram showing spectral properties of a green filter (G) shown in FIG. 3.

As shown in FIG. 3, the color wheel 35 shows a circular shape, and 6 color filters (a filter 35R for red, a filter 35Y for yellow, a filter 35G for green, a filter 35C for cyan, a filter 35B for blue, and a filter 35M for magenta) are arranged in a circular direction. The filters 35R, 35G, and 35B are the primary color filters for dividing the lights into the primary colors red (R), green (G) and blue (B) each having the spectral properties shown in FIGS. 4A to 4C. Those primary color filters 35R, 35G, and 35B are arranged equally each having the equal angle at center of the color wheel 35. In this embodiment, the angle may be 60 degrees.

The filter 35Y is one of the intermediate colored filters which is arranged between the green filter 35G and the red filter 35R. The filter 35Y is colored by yellow (Y) which is a complementary color between green and red (G+R) of the adjacent filters 35G and 35R. The filter 35C is another intermediate colored filter arranged between the green filter 35G and the blue filter 35B. The filter 35C is colored by cyan (C) which is a complementary color between green and blue (B+G) of the adjacent filters 35G and 35B. The filter 35M is also one of the intermediate color filters being arranged between the blue filter 35B and the red filter 35R. The filter 35M is colored by magenta (M) which is a complementary color between blue and red (R+B) of the adjacent filters 35B and 35R.

On the color wheel 35, there is a hole 35a at between the red filter 35R and the magenta filter 35M. The hole 35a is designed to detect positions of the color filters 35R, 35Y, 35G, 35C, 35B, and 35M.

The color wheel motor 36 drives the color wheel 35 to rotate. In this embodiment, the color wheel motor 36 rotates the color wheel 35 in the direction so that the lights from the lamp 32 penetrates the color filters on the color wheel 35 sequentially in order of red, yellow, green, cyan, blue, and magenta.

Figure 5:
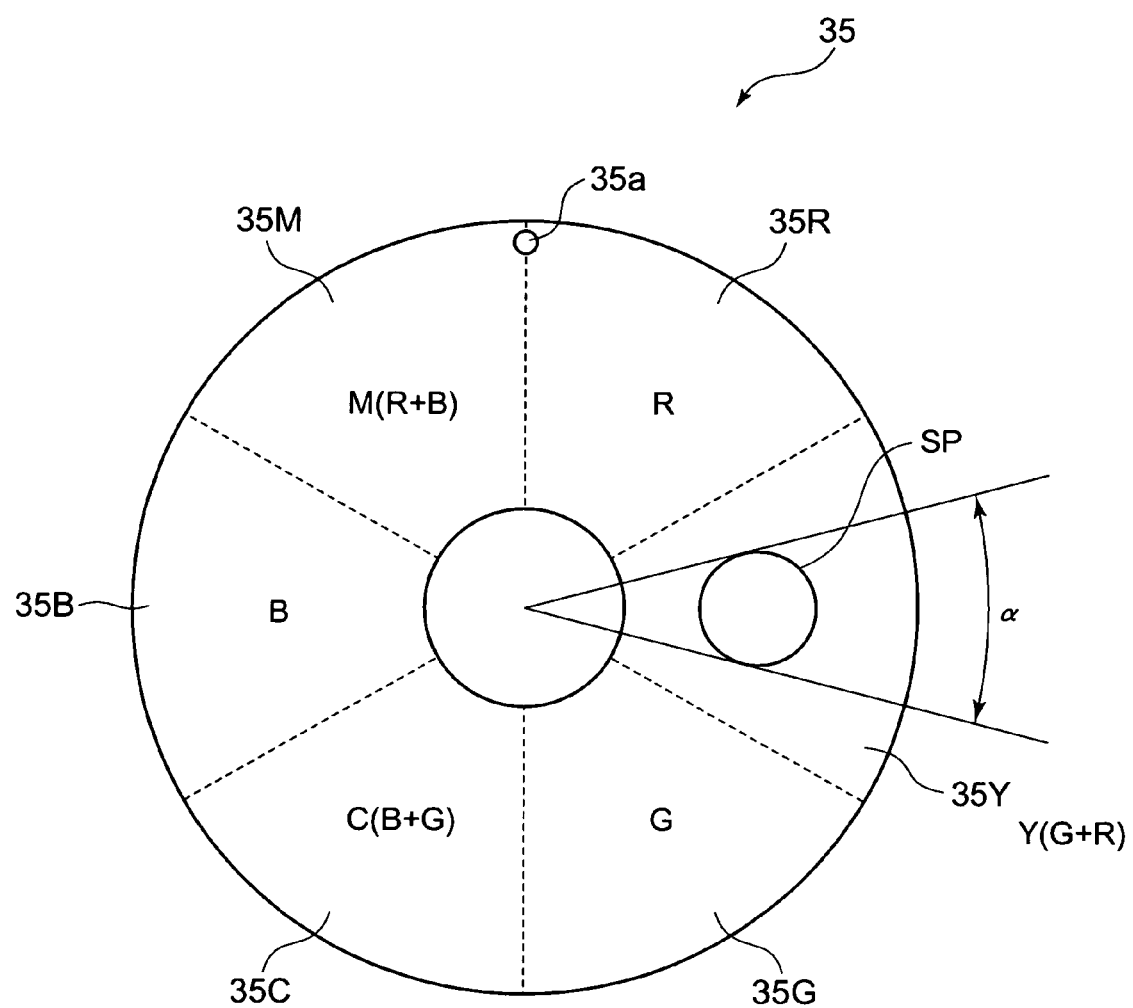
FIG. 5 is a diagram showing a light spot on the color wheel show in FIG. 2.

The color wheel 35 thus rotates by the color wheel motor 36, and the lights from the lamp 32 go through the filters on the rotating color wheel 35. A point where the lights go through the color wheel 35 is shown in FIG. 5 as a light spot SP. In this embodiment, the size of the light spot SP is represented by angle α (see FIG. 5). Angle α is an angle between 2 straight lines both touching the circumference of the light spot SP while meeting at the center of the color wheel 35.

The lights from the lamp 32 are divided into colored lights of red, yellow, green, cyan, blue or magenta when penetrating the color filters on the color wheel 35, and such the colored lights go toward the spatial light modulator 31 sequentially.

The color wheel controller 37 controls the color wheel motor 36 to control rotation speed of the color wheel 35. Timing signals representing timings for synchronous with color signals (red, yellow, green, cyan, blue, and magenta) are supplied from the time division driver 39 to the color wheel controller 37. The color wheel controller 37 controls the color wheel motor 36 in accordance with the supplied timing signals.

The photo sensor 38 may be comprised of photo couplers to detect positions of the color filters 35R, 35Y, 35G, 35C, 35B, and 35M. The photo sensor 38 detects the lights going through the hole 35a on the color wheel 35, and supplies detection signals to the time division driver 39.

The time division driver 39 divides the RGB signals supplied from the RGB converter 26 in time sequence, thus generates primary color signals (a red color signal (R), a green color signal (G) and a blue color signal (B): RGB signals). The time division driver 39 drives the spatial light modulator 31 by supplying the divided RGB signals to the spatial light modulator 31.

In this embodiment, the time division driver 39 additionally generates a white color signal and intermediate color signals (a yellow color signal (Y), a magenta color signal (M) and a cyan color signal (C): YMC signals) by calculation based on the RGB signals supplied from the RGB converter 26. The time division driver 39 also divide those additional color signals in time sequence, and drives the spatial light modulator 31 by supplying those signals thereto.

The time division driver 39 also obtains the detection signals from the photo sensor 38, thus obtains position of the light spot SP on the color wheel 35. The time division driver 39 supplies the divided RGB signals to the spatial light modulator 31 so as to correspond with the RGB colored lights divided by the primary color filters on the color wheel 35 during a term where the light spot SP is on the primary color filters 35R, 35G or 35B.

Also, the time division driver 39 supplies the divided YMC signals to the spatial light modulator 31 so as to correspond with the YMC colored lights divided by the intermediate color filters on the color wheel 35 during another term where the light spot SP is on the intermediate color filters 35Y, 35M or 35C.

Figure 6:
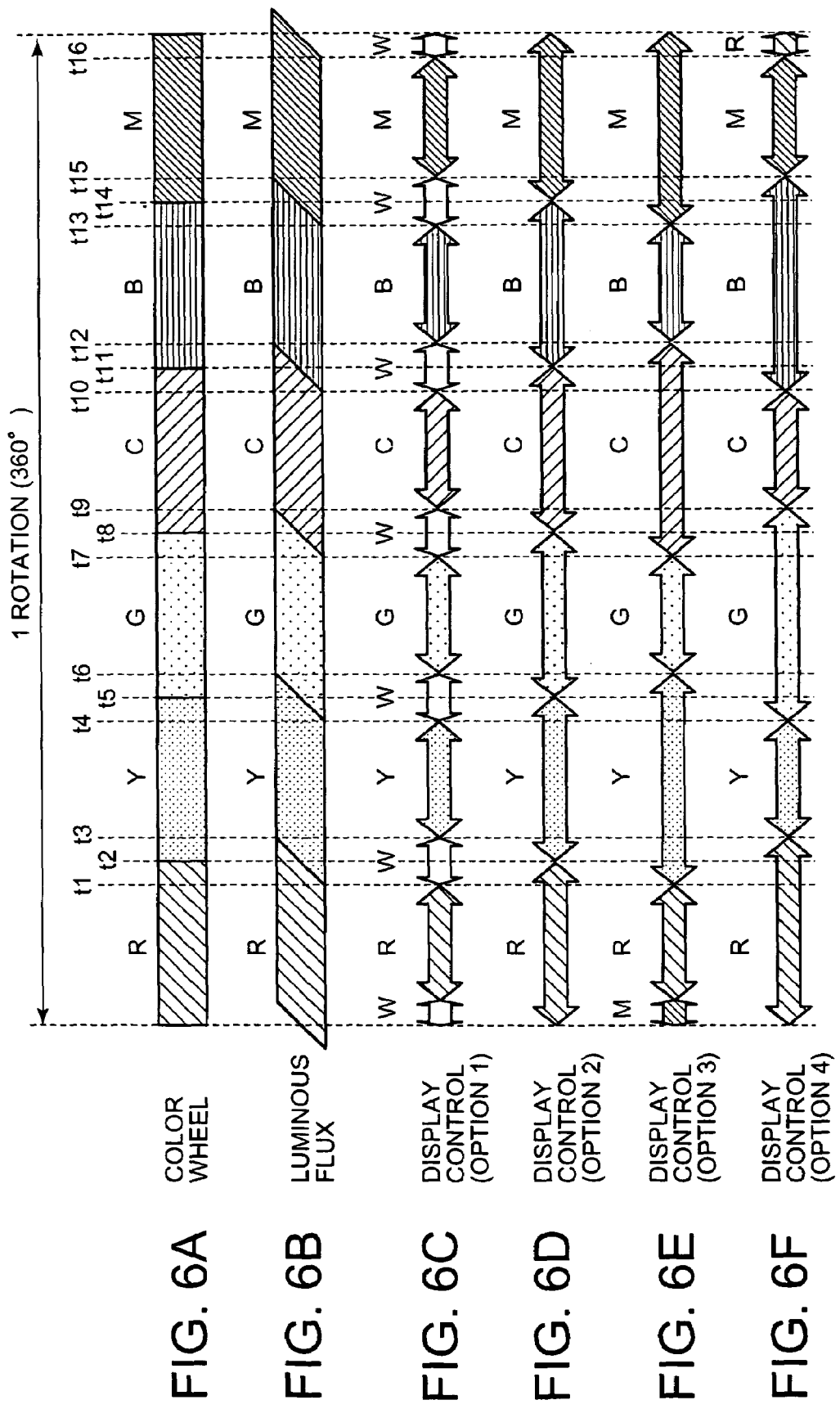
FIG. 6A is a diagram showing changes of color filters on the color wheel in accordance with 1 rotation of the color wheel.
FIG. 6B is a diagram showing changes of luminous fluxes in accordance with 1 rotation of the color wheel.
FIG. 6C is a diagram for explaining display control option 1 executed by the time division driver shown in FIG. 2.
FIG. 6D is a diagram for explaining display control option 2 executed by the time division driver shown in FIG. 2.
FIG. 6E is a diagram for explaining display control option 3 executed by the time division driver shown in FIG. 2.
FIG. 6F is a diagram for explaining display control option 4 executed by the time division driver shown in FIG. 2.

If the light spot SP appears on both the primary color filter and the intermediate color filter, it is a color mixture term where the primary color and the intermediate color are mixed. During the color mixture term, the time division driver 39 performs one of the display control options 1 to 4. These display controls will now be described with reference to FIG. 6. FIG. 6A shows an order of the color filters according to a rotation of the color wheel 35. FIG. 6B shows changes of luminous fluxes according to a rotation of the color wheel 35. FIG. 6C shows changes of signals output by the time division driver 39 in a rotation of the color wheel 35 when the display control option 1 is performed.

In FIG. 6, a term until time t1 from beginning represents a term where the lamp 32 emits lights toward the filter 35R of the color wheel 35 via the mirror tube 34, that is, the term where red colored luminous fluxes go toward the spatial light modulator 31 from the color wheel 35.

As the same manner, terms each between t3 and t4, t6 and t7, t9 and t10, t12 and t13, and, t15 and t16 are terms where the luminous fluxes are colored by yellow, green, cyan, blue, and magenta respectively. On the contrary, terms each between t1 and t3, t4 and t6, t7 and t9, t10 and t12, and, t13 and t15 are color mixture terms each mixtures are red and yellow, yellow and green, green and cyan, cyan and blue, and, blue and magenta respectively. And, times t2, t5, t8, t11 and t14 are times at which two colors are mixed equally because the lights from the lamp 32 go through the 2 filters equally at those points.

The display control option 1 is prepared for improving brightness of the projected images. In this case, the time division driver 39 controls the spatial light modulator 31 by supplying white color signals as the brightness control signal (hereinafter, referred to as "brightness signal W") thereto during the color mixture terms.

The display control options 2 to 4 are prepared for enhancing hue. The option 2 is a display control for enhancing both the primary colors and the intermediate colors equally. In this case, the time division driver 39 controls the spatial light modulator 31 by supplying a color signal corresponding to color whose mixture rate is higher than that of the other mixed color during the color mixture terms.

The display control option 3 is prepared for enhancing the intermediate colors. In this case, the time division driver 39 controls the spatial light modulator 31 by supplying intermediate color signals thereto during the color mixture terms.

The display control option 4 is prepared for enhancing the primary colors. In this case, the time division driver 39 controls the spatial light modulator 31 by supplying primary color signals thereto during the color mixture terms.

The time division driver 39 controls the spatial light modulator 31 with predetermined frame rate, for example, 30 frames per second.

The light source lens 40 is a lens for gathering the lights from the color wheel 35 onto the spatial light modulator 31.

The projection lens 41 is another lens for focusing the images by the lights from the spatial light modulator 31 onto the screen 2.

The control unit 14 is a central controller of the projector 1 for controlling the most of the components in the projector 1. The control unit 14 may comprise a CPU, a ROM, a RAM, and the like (not shown). The CPU is a processor for controlling any components in the projector 1. The ROM is a memory device for storing programs to be executed by the CPU, and the like. The RAM is another memory device for storing data required for operations by the CPU, and the like.

The control unit 14 controls the time division driver 39 in the projector engine 13 so that the time division driver 39 performs any one of the above display options 1 to 4.

Operations by such structured projector 1 according to the embodiment of the present invention will now be described.

First of all, image data and audio data are supplied to the I/O interface 21. The audio processor 24 converts the supplied audio data into analog signals and outputs the audio signals to the speaker 12. The speaker 12 outputs sounds based on the supplied audio signals.

The image processor 22 converts the supplied image data into predetermined formatted data, and stores them in the image memory 23.

The RGB converter reads out the image data from the image memory 23, and develops them in the video RAM. The RGB converter converts the image data developed in the video RAM into RGB signals, and supplies the RGB signals to the projector engine 13.

The time division driver 39 in the projector engine 13 performs calculation based on the supplied RGB signals to generate the brightness signal W. Then, the time division driver 39 divides the RGB signals and the brightness signal W in time sequence.

The time division driver 39 also determines position of the color wheel 35 based on the detection signals supplied from the photo sensor 38.

The control unit 14 controls the time division driver 39 to perform one of the display control options 1 to 4.

Operations of the time division driver 39 for the display control options 1 to 4 will now be described with reference to FIGS. 6A to 6F.

If it is required to improve the brightness of the projected image, the control unit 14 controls the time division driver 39 to perform the display control option 1. Hereinafter, operations during a term where the color changes from red to green will now be described in detail with reference to FIGS. 7A to 7E and FIGS. 8A to 8E in addition to FIGS. 6A to 6F.

Figure 7:
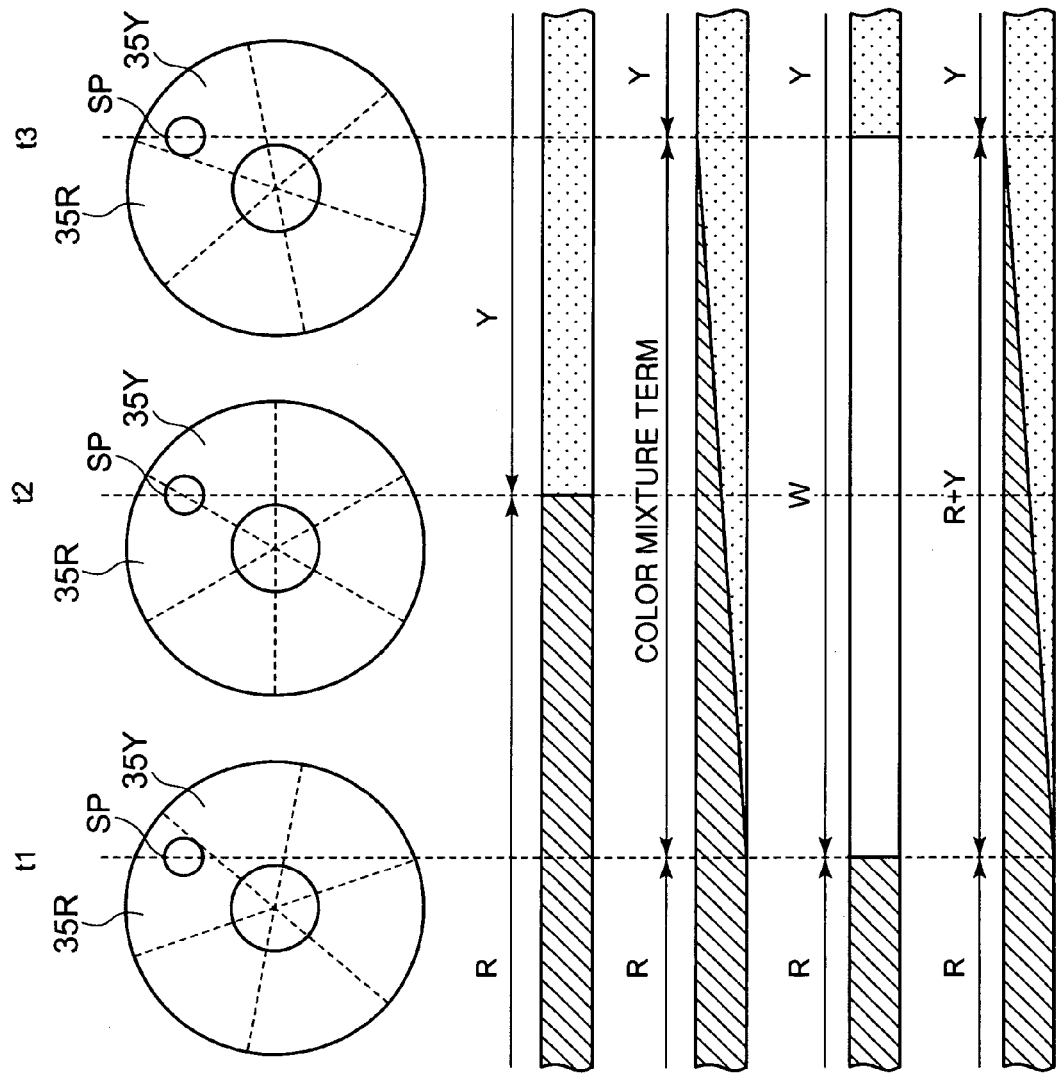
FIG. 7A is a diagram showing changes of a light spot from red filter to yellow filter on the color wheel during the display control option 1.
FIG. 7B is a diagram showing changes of the color filters on the color wheel in accordance with the light spot shown in FIG. 7A during the display control option 1.
FIG. 7C is a diagram showing changes of luminous fluxes in accordance with the light spot shown in FIG. 7A during the display control option 1.
FIG. 7D is a diagram showing changes of color signals output by the time division drive in accordance with the light spot shown in FIG. 7A during the display control option 1.
FIG. 7E is a diagram showing changes of projected lights in accordance with the light spot shown in FIG. 7A during the display control option 1.

FIG. 7A shows positions of the light spot SP at t1, t2 and t3 in the color mixture term of red and yellow. FIG. 7B shows changes of the color filters having the light spot SP during the term from t1 to t3. FIG. 7C shows changes of the luminous fluxes from the color wheel 35 during the term from t1 to t3. FIG. 7D shows changes of the signals output by the time division driver 39 during the term from t1 to t3. FIG. 7E shows changes of the projected lights during the term from t1 to t3.

Figure 8:
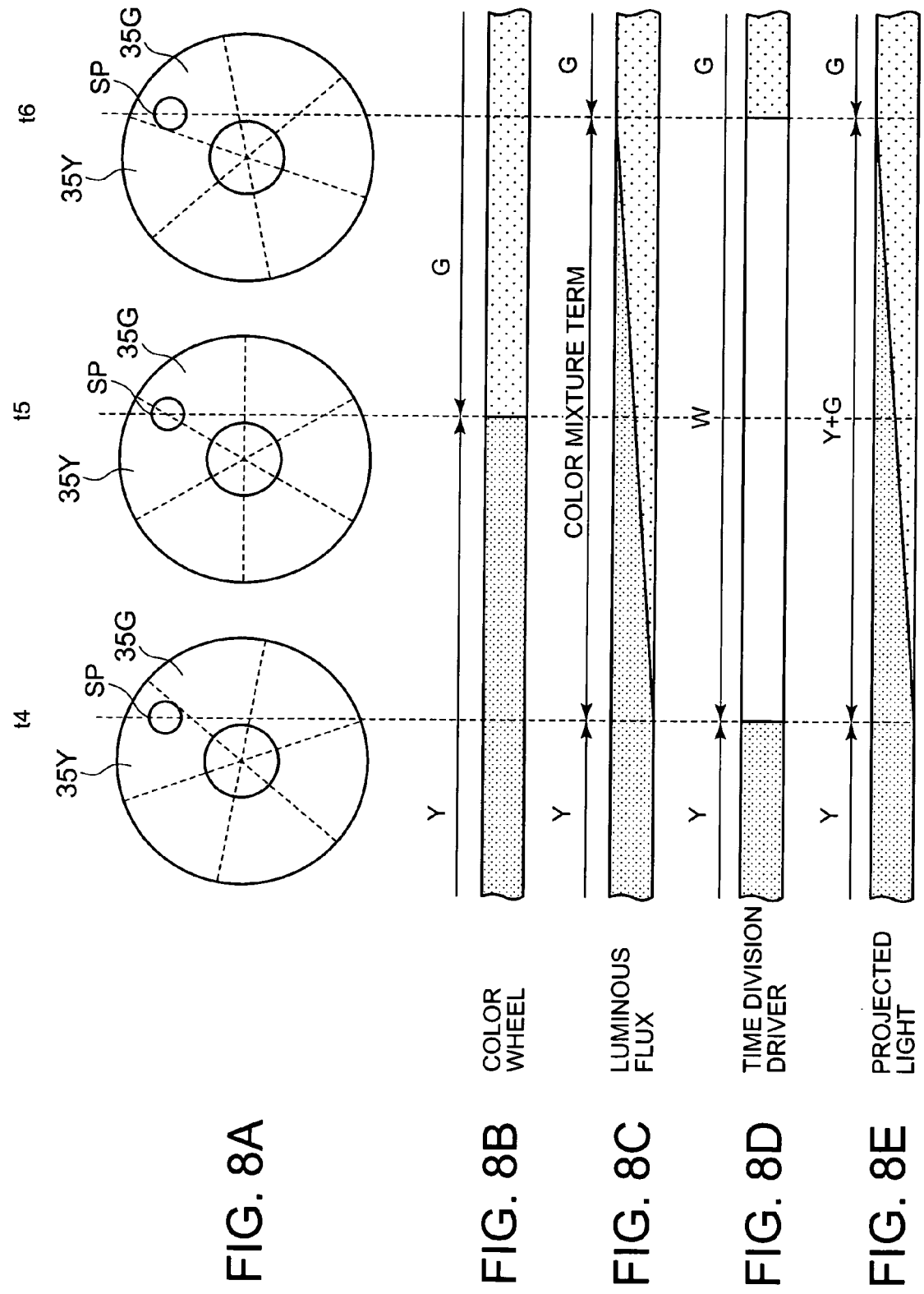
FIG. 8A is a diagram showing changes of a light spot from yellow filter to green filter on the color wheel during the display control option 1.
FIG. 8B is a diagram showing changes of the color filters on the color wheel in accordance with the light spot shown in FIG. 8A during the display control option 1.
FIG. 8C is a diagram showing changes of luminous fluxes in accordance with the light spot shown in FIG. 8A during the display control option 1.
FIG. 8D is a diagram showing changes of color signals output by the time division drive in accordance with the light spot shown in FIG. 8A during the display control option 1.
FIG. 8E is a diagram showing changes of projected lights in accordance with the light spot shown in FIG. 8A during the display control option 1.
Figure 9:
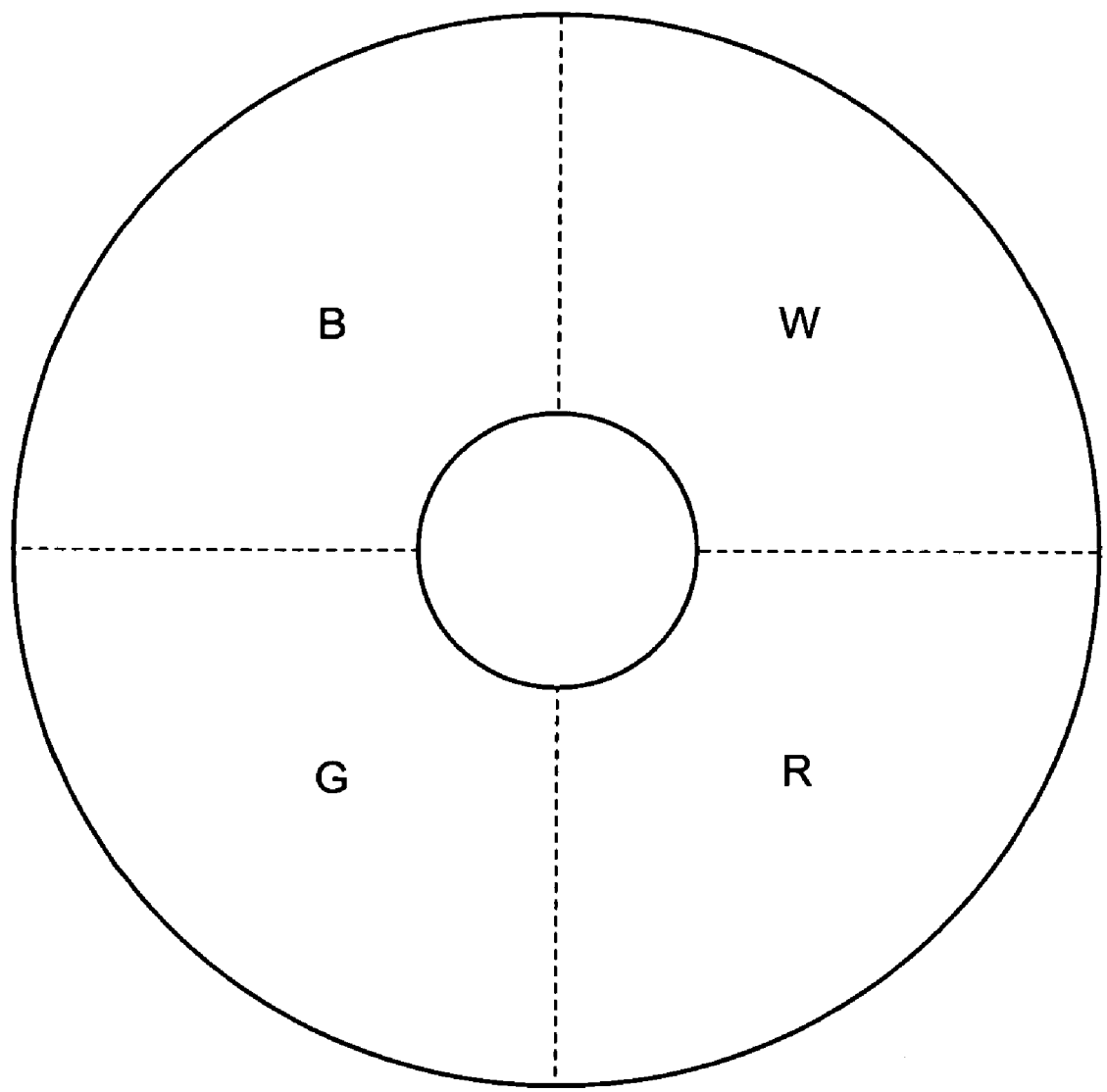
FIG. 9 is a diagram exemplifying filter arrangement in a conventional color wheel.

FIG. 8A shows positions of the light spot SP at t4, t5 and t6 in the color mixture term of yellow and green. FIG. 8B shows changes of the color filters having the light spot SP during the term from t4 to t6. FIG. 8C shows changes of the luminous fluxes from the color wheel 35 during the term from t4 to t6. FIG. 8D shows changes of the signals output by the time division driver 39 during the term from t4 to t6. FIG. 8E shows changes of the projected lights during the term from t4 to t6.

To perform the display control option 1, the time division driver 39 begins to control the spatial light modulator 31 by supplying the red color signal to the spatial light modulator 31 until time t1 (see FIG. 6C).

When it comes to time t1 where the next color mixture term of red and yellow begins (see FIG. 6B), the time division driver 39 begins to supply the brightness signal W to the spatial light modulator 31 (see FIG. 6C and FIG. 7D).

During this color mixture term of red and yellow, red colored luminous fluxes from the color wheel 35 become weaker gradually, while yellow colored luminous fluxes become stronger gradually, as shown in FIG. 7C. In the same manner, the projected lights from the projector engine 13 show the same changes as that of the luminous fluxes as shown in FIG. 7E. That is, red colored projected lights become weaker gradually, while yellow colored projected lights become stronger gradually.

Since yellow is composite color of red and green, the projected lights change to yellow from red smoothly even if red and yellow are mixed during the color mixture term. Moreover, the brightness of the projected images improves because the brightness signal is supplied to the spatial light modulator 31 during the color mixture term of red and yellow.

When it comes to t3, the next intermediate color term of yellow begins (see FIG. 6C and FIG. 7C). During this term, the time division driver 39 supplies yellow color signals to the spatial light modulator 31 so as to correspond to the yellow colored lights from the color wheel 35 (see FIG. 7D).

When it comes to t4, the next color mixture term of yellow and green begins (see FIG. 6C and FIG. 8C). The time division driver 39 begins to supply the brightness signal W to the spatial light modulator 31 (see FIG. 8D).

As shown in FIG. 8C, during the color mixture term of between t4 and t6 where yellow and green are mixed, yellow colored luminous fluxes become weaker gradually, while green colored luminous fluxes become stronger gradually.

According to the operation by the time division driver 39 supplying the brightness signal W to the spatial light modulator 31 during the color mixture term of yellow and green, the projected lights shows mixed color of yellow and green, as shown in FIG. 8E.

Since yellow is a composite color of red and green, as aforementioned, the color of the projected lights changes to green from yellow smoothly even if yellow and green are mixed during the color mixture term. Moreover, brightness of the projected image improves because the brightness signal W is supplied to the spatial light modulator 31 during the color mixture term of yellow and green.

When it comes to t6, the color mixture term of yellow and green ends. The time division driver 39 continues to control the spatial light modulator 31 in the same manner for the other terms.

That is, after the color mixture term of yellow and green, the next primary color term of green begins at t6. During this term between t6 and t7 where the luminous fluxes are green (see FIG. 6B), the time division driver 39 supplies the green color signal to the spatial light modulator 31 (see FIG. 6C).

After the primary color term of green, the next color mixture term begins at t7. During the color mixture term between t7 and t9 where green and cyan are mixed (see FIG. 6B), the time division driver 39 supplies the brightness signal W to the spatial light modulator 31 (see FIG. 6C).

After the color mixture term of green and cyan, the next intermediate color term of cyan begins. During this term between t9 and t10 where the luminous fluxes are cyan (see FIG. 6B), the time division driver 39 supplies cyan color signal to the spatial light modulator 31 (see FIG. 6C).

After the intermediate color term of cyan, the next color mixture term of cyan and blue begins at t10. During the color mixture term between t10 and t12 where cyan and blue are mixed (see FIG. 6B), the time division driver 39 supplies the brightness signal W to the spatial light modulator 31 (see FIG. 6C).

After the color mixture term of cyan and blue, the next primary color term of blue begins at t12. During this term between t12 and t13 where the luminous fluxes are blue (see FIG. 6B), the time division driver 39 supplies blue color signals to the spatial light modulator 31 (see FIG. 6C).

After the primary color term of blue, the next color mixture term of blue and magenta begins at t13. During this term between t13 and t15 where blue and magenta are mixed (see FIG. 6B), the time division driver 39 supplies the brightness signal W to the spatial light modulator 31 (see FIG. 6C).

Accordingly, when the display control option 1 is executed, the time division driver 39 supplies primary color signals during the primary color terms, intermediate color signals during the intermediate color terms, and brightness signals W during the color mixture terms, thus the brightness of the projected images improves.

If it is required to enhance hue, the control unit 14 controls the time division driver 39 to execute one of the display control options 2 to 4.

In case of equal enhancement of both the primary colors and the intermediate colors, the control unit 14 controls the time division driver 39 to perform display control option 2. Operations of the display control option 2, will now be described with reference to FIG. 6D.

In this case, when it comes to t1 where the color mixture term of red and yellow begins, the time division driver 39 begins to control the spatial light modulator 31 by supplying the red color signal, because mixture rate of red is higher than that of yellow at beginning of the color mixture term of red and yellow.

As the color wheel 35 rotates, red lights become weaker while yellow lights become stronger (see FIG. 6B). When the mixture rates of red and yellow become equal to each other at t2, the time division driver 39 begins to supply yellow color signal (intermediate color) to the spatial light modulator 31.

Unlike the above described display control option 1, the time division driver 39 does not supply the brightness signal W to the spatial light modulator 31 during the color mixture term, thus hue is enhanced. Since yellow is a composite color of red and green, color of the projected images changes to green from red smoothly via yellow during the color mixture term. Since the primary color signals and the intermediate color signals are supplied equally during the color mixture term, both the primary colors and the intermediate colors are enhanced equally.

After t3, the time division driver 39 controls the spatial light modulator 31 in the same manner by supplying corresponding primary and intermediate color signals during each of the color mixture terms (see FIG. 6D), thus the other the primary colors (green, blue) and the intermediate color between them (cyan, magenta) will be enhanced equally as well.

If it is required to enhance the intermediate colors, the control unit 14 controls the time division driver 39 to execute display control option 3. Operations of the time division driver 39 for the display control option 3 will now be described with reference to FIG. 6E.

In this case, when it comes to t1 where the color mixture term of red and yellow begins, the time division driver 39 begins to control the spatial light modulator 31 by supplying the yellow color signal (intermediate color) to the spatial light modulator 31. The time division driver 39 continues to supplied the yellow color signal to the spatial light modulator 31 during the intermediate color term of yellow (from t3 to t4) until the next color mixture term of yellow and green ends (from t4 to t6). Since the intermediate color signal is supplied during the color mixture term, the intermediate color is enhanced.

The time division driver 39 controls the spatial light modulator 31 in the same manner by supplying corresponding intermediate color signals thereto during each of the color mixture terms (see FIG. 6E), thus the other intermediate colors (cyan, magenta) will be enhanced as well.

If it is required to enhance primary colors, the control unit 14 controls the time division driver 39 to execute display control option 4. Operations of the time division driver 39 for the display control option 4 will now be described with reference to FIG. 7F.

In this case, the time division driver 39 begins to control the spatial light modulator 31 by supplying red color signal (primary color) to the spatial light modulator 31 during the color mixture term or red and yellow between t1 and t3.

When it comes to t3 where the color mixture term of red and yellow ends, the time division driver 39 supplies yellow color signals (intermediate color) to the spatial light modulator 31. Since the primary color signal is supplied during the color mixture term, primary colors are enhanced.

After t3, the time division driver 39 controls the spatial light modulator 31 in the same manner by supplying corresponding color signals thereto during each of the color mixture terms (see FIG. 6F), thus the other primary colors (green, blue) will be enhanced as well.

According to the projector 1 of the present embodiment, various display controls as described above are available, because it realizes fine intermediate color control being synchronous with the lights from the color wheel 35.

The color wheel 35 of this embodiment according to the present invention has the intermediate color filters in addition to the primary color filters, that is, the color wheel 35 is 6-segment color wheel. Even if such the 6-segment structure, it realizes highly improved brightness as the same as the conventional 4-segment structure.

If defining brightness values of white, red, green and blue based on their spectral properties as w, r, g, and b respectively where w=r+g+b, and brightness value 1 as brightness where whole of the color wheel (360 degrees) is white, the brightness values of the conventional projector having a 4-segment color wheel are represented by:

$w/4=1/4, r/4+g/4+b/4=(r+g+b)/4=1/4$

Therefore, the total brightness value from whole of the 4-segment color wheel (=360 degrees) will be:

$w/4+r/4+g/4+b/4=1/4+1/4=1/2$

On the contrary, the projector 1 according to the present invention has intermediate colors yellow, magenta, and cyan. If defining brightness values of yellow, magenta, and cyan as y, m, and c, brightness values of the present projector having the 6-segment color wheel are represented by:

$(r+g+b)/6=1/6, (y+m+c)/6=2\cdot(r+g+b)/6=2/6=1/3$

Therefore, the total brightness value from whole of the 6-segment color wheel (=360 degrees) will be:

$r/6+g/6+b/6+y/6+m/6+c/6=1/6+1/3=1/2$

That is, the brightness value of the projector 1 according to the embodiment is equal to the brightness value of the conventional projector.

According to the present embodiment, as described above, the RGB primary color filters 35R, 35G and 35B are arranged equally in the color wheel 35, and the complementary color filters 35C, 35M and 35Y of typical intermediate colors are arranged between each adjacent primary color filters.

This structure allows that the adjacent colors have the same color components each other even if it is the color mixture term. As a result, hue of the projected images corresponding to the color mixture regions is more improved than the conventional projector, while realizing the high brightness as the same as the conventional 4-segment color wheel. It also brings well-balanced hue because total hue of the color mixture regions just becomes white. Therefore, it improves the color reproduction performance.

Moreover, it enables easy linear control for improvement of the color reproduction performance at any phases such as high brightness display and high purity display.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

For example, the above embodiment exemplified the color wheel 35 has the 6-segment structure with 6 color filters. The number of segments (colors) is not limited to 6, for example, each of the intermediate color filters has a plurality of filters in accordance with gradation of the intermediate color.

That is, the above embodiment just showed an example of a color wheel according to the present invention. According to the brightness value calculation described above, it seems that the color wheel must have equally arranged segments each angle at the wheel center is 60 degrees. However, the present invention may be applicable even if the color wheel has unequally arranged segments. For example, the present invention may be applicable to a case where a color wheel has RGB segments having 90 degrees center angle for each, while each of YMC segments is 30 degrees.

Brightness value resultant from such the unequally arranged segments differs from the brightness value example described above. However, it results better hue rather than a case where a color wheel has a W (white) segment instead of the YMC segments, and projected images are brighter rather than a case where a color wheel has only RGB segments.

Though the time division driver 39 supplies the white color signals as the brightness control signal to the spatial light modulator 31 during the color mixture terms when it executes display control option 1 in the above embodiment, the time division driver 39 may supply black color signals to the spatial light modulator 31 during the color mixture terms for controlling brightness or hue.

Though the above embodiment exemplifies a case where the present invention is realized by the projector 1 which projects images based on electric image signals, the present invention may be applicable to various projectors such as a film projector for movie films or still picture films.

This application is based on Japanese Patent Application No. 2005-89624 (filed on Mar. 25, 2005), and including specification, claims, drawings and summary. The disclosures of the above Japanese Patent Application are incorporated herein by reference in its entirety.

What is claimed is:

1. A projector comprising:
   a light source which emits light;
   a filter unit which includes: (i) a plurality of primary color filters for dividing the light from said light source into a plurality of primary color lights, and (ii) a plurality of intermediate color filters, each of which is arranged between adjacent ones of the primary color filters, and each of which is colored by an intermediate color between adjacent ones of the primary colors, wherein the filter unit sequentially emits lights of the primary colors and the intermediate colors after the light from the light source is projected through the primary color filters and the intermediate color filters;

a spatial light modulator which is driven to project the colored lights from said filter unit to a screening member to project images; and a display driver, to which a plurality of primary color signals for generating said images to be projected onto said screening member are supplied, which supplies the primary color signals to said spatial light modulator so that the primary color lights from the filter unit respectively correspond to the primary color signals supplied to the display driver, while controlling the spatial light modulator by selecting one of a plurality of different display control methods of supplying signals to the spatial light modulator when the lights from the filter unit are mixed colors of one of the primary colors and one of the intermediate colors, and supplying the signals to the spatial light modulator in accordance with the selected display control method;

wherein the color filters on the filter unit are arranged in order of red, yellow, green, cyan, blue and magenta.

2. The projector according to claim 1, wherein said display driver selectively supplies the color signals to said spatial light modulator for controlling said spatial light modulator when the lights emitted from said filter unit are mixed colors of one of the primary colors and one of the intermediate colors.

3. The projector according to claim 2, wherein said display driver generates brightness signals based on said supplied plurality of primary color signals and supplies the generated brightness signals to said spatial light modulator to drive said spatial light modulator when the lights emitted from said filter unit are mixed colors of one of the primary colors and one of the intermediate colors.

4. The projector according to claim 2, wherein said display driver selects the color signals representing colors of said primary colors and said intermediate colors whose mixture rate is increasing as the signals to be supplied to said spatial light modulator when the lights emitted from said filter unit are mixed colors of one of the primary colors and one of the intermediate colors.

5. The projector according to claim 2, wherein said display driver supplies the color signals of the intermediate colors to said spatial light modulator to drive the spatial light modulator when the lights emitted from the filter unit are mixed colors of one of the primary colors and one of the intermediate colors.

6. The projector according to claim 2, wherein said display driver selects primary color signals corresponding to said primary colors as the signals to be supplied to said spatial light modulator when the lights emitted from said filter unit are mixed colors of one of the primary colors and one of the intermediate colors.

7. The projector according to claim 1, wherein said display driver generates brightness signals based on said supplied plurality of primary color signals and supplies the generated brightness signals to said spatial light modulator to drive said spatial light modulator when the lights emitted from said filter unit are mixed colors of one of the primary colors and one of the intermediate colors.

8. The projector according to claim 1, wherein said display driver selects the color signals representing colors of said primary colors and said intermediate colors whose mixture rate is increasing as the signals to be supplied to said spatial light modulator when the lights emitted from said filter unit are mixed colors of one of the primary colors and one of the intermediate colors.

9. The projector according to claim 1, wherein said display driver supplies the color signals of the intermediate colors to said spatial light modulator to drive the spatial light modulator when the lights emitted from the filter unit are mixed colors of one of the primary colors and one of the intermediate colors.

10. The projector according to claim 1, wherein said display driver selects primary color signals corresponding to said primary colors as the signals to be supplied to said spatial light modulator when the lights emitted from said filter unit are mixed colors of one of the primary colors and one of the intermediate colors.

11. A projector comprising:

a light source unit which emits light;

a filter unit which divides the light from said light source unit into a plurality of primary color lights by a plurality of primary color filters and a plurality of intermediate color lights by a plurality of intermediate color filters arranged between adjacent ones of the primary color filters each of which is colored by an intermediate color between adjacent ones of the primary colors;

a spatial light modulation unit which projects the colored lights from said filter unit to a screening member to project images; and a display control unit which generates intermediate color signals based on a plurality of supplied primary color signals for the images to be projected onto said screening member, and which drives the spatial light modulation unit (i) by supplying said primary color signals to said spatial light modulation unit so that the primary colors of the supplied primary color signals correspond to the primary colors of the lights emitted from said filtering unit, (ii) by supplying the generated intermediate color signals to said spatial light modulation unit so that the intermediate colors of the generated intermediate color signals correspond to the intermediate colors of the lights emitted from said filtering unit, and (iii) by selecting one of a plurality of different display control methods of supplying signals to the spatial light modulation unit when the lights from the filter unit are mixed colors of one of the primary colors and one of the intermediate colors, and supplying the signals to the spatial light modulation unit in accordance with the selected display control method.

* * * * *